(12) United States Patent
Ike et al.

(10) Patent No.: US 9,874,211 B2
(45) Date of Patent: Jan. 23, 2018

(54) OIL PUMP AND POWER TRANSMITTING DEVICE EQUIPPED WITH THE SAME

(71) Applicant: AISIN AW CO., LTD., Anjo-shi, Aichi-ken (JP)

(72) Inventors: Nobukazu Ike, Kariya (JP); Yuichi Seki, Okazaki (JP); Yusuke Takahashi, Anjo (JP)

(73) Assignee: AISIN AW CO., LTD., Anjo-Shi, Aichi-Ken (JP)

( * ) Notice: Subject to any disclaimer, the term of this patent is extended or adjusted under 35 U.S.C. 154(b) by 197 days.

(21) Appl. No.: 14/767,830

(22) PCT Filed: Mar. 17, 2014

(86) PCT No.: PCT/JP2014/057163
§ 371 (c)(1),
(2) Date: Aug. 13, 2015

(87) PCT Pub. No.: WO2014/156772
PCT Pub. Date: Oct. 2, 2014

(65) Prior Publication Data
US 2016/0003245 A1 Jan. 7, 2016

(30) Foreign Application Priority Data
Mar. 29, 2013 (JP) ................................ 2013-074630

(51) Int. Cl.
*F04C 2/10* (2006.01)
*F16H 57/04* (2010.01)
(Continued)

(52) U.S. Cl.
CPC ............ *F04C 15/0061* (2013.01); *F04C 2/10* (2013.01); *F04C 15/008* (2013.01); *F16H 55/30* (2013.01);
(Continued)

(58) Field of Classification Search
CPC .... F04C 2/10; F04C 15/0061; F16H 57/0441; F16H 57/0434; F16H 57/0436; F16H 61/0025
See application file for complete search history.

(56) References Cited

U.S. PATENT DOCUMENTS 3,153,326 A * 10/1964 Madson .............. F16H 61/0025
60/358
7,086,372 B2 * 8/2006 Takiguchi ........... F04C 15/0061
123/196 R
(Continued)

FOREIGN PATENT DOCUMENTS

JP 643339 U 6/1994
JP 08-68456 A 3/1996
(Continued)

OTHER PUBLICATIONS

International Search Report of PCT/JP2014/057163 dated Jun. 3, 2014 [PCT/ISA/210].

*Primary Examiner* — Peter J Bertheaud
(74) *Attorney, Agent, or Firm* — Sughrue Mion, PLLC

(57) ABSTRACT

A driven sprocket of a chain driving mechanism is fixed to a rotation shaft between a front pump cover and a converter housing, and the rotation shaft is supported by a first supporting hole of the front pump cover and a second supporting hole of a rear pump cover. The movement of the driven sprocket in such a direction that it approaches the converter housing is restricted by a case side projection formed on the converter housing, and the movement of the driven sprocket in such a direction that it separates from the converter housing is restricted by a cover side projection formed on a bottom surface of the second supporting hole.

10 Claims, 5 Drawing Sheets

(51) Int. Cl.
*F04C 15/00* (2006.01)
*F16H 61/00* (2006.01)
*F16H 57/05* (2006.01)
*F16H 55/30* (2006.01)
*F16H 3/66* (2006.01)

(52) U.S. Cl.
CPC ......... *F16H 57/04* (2013.01); *F16H 57/0434* (2013.01); *F16H 57/0441* (2013.01); *F16H 57/05* (2013.01); *F16H 61/0025* (2013.01); *F16H 3/663* (2013.01); *F16H 2200/0052* (2013.01); *F16H 2200/2007* (2013.01); *F16H 2200/2023* (2013.01); *F16H 2200/2043* (2013.01); *F16H 2200/2066* (2013.01); *F16H 2200/2082* (2013.01); *F16H 2200/2097* (2013.01)

(56) References Cited

U.S. PATENT DOCUMENTS

| | | | |
|---|---|---|---|
| 7,798,299 B2 * | 9/2010 | Schultz | F16H 45/02 192/3.27 |
| 8,573,953 B2 * | 11/2013 | Toi | F16H 61/0025 417/360 |
| 2006/0059981 A1 | 3/2006 | Takahashi et al. | |
| 2011/0315506 A1 | 12/2011 | Toi et al. | |

FOREIGN PATENT DOCUMENTS

| | | |
|---|---|---|
| JP | 09-205755 A | 8/1997 |
| JP | 2006-071026 A | 3/2006 |
| JP | 2006-266163 A | 10/2006 |
| JP | 2006-275164 A | 10/2006 |
| JP | 2010-203575 A | 9/2010 |

\* cited by examiner

FIG. 2

|  | C1 | C2 | C3 | B1 | B2 | F1 |
|---|---|---|---|---|---|---|
| P |  |  |  |  |  |  |
| REV |  |  | O |  | O |  |
| N |  |  |  |  |  |  |
| D 1st | O |  |  |  | ● | O |
| D 2nd | O |  |  | O |  |  |
| D 3rd | O |  | O |  |  |  |
| D 4th | O | O |  |  |  |  |
| D 5th |  | O | O |  |  |  |
| D 6th |  | O |  | O |  |  |

※ O: ENGAGED
● : ENGAGED WHEN ENGINE BRAKE IS IN OPERATION

OIL PUMP AND POWER TRANSMITTING DEVICE EQUIPPED WITH THE SAME

CROSS REFERENCE TO RELATED APPLICATIONS

This application is a National Stage of International Application No. PCT/JP2014/057163, filed Mar. 17, 2014, claiming priority based on Japanese Patent Application No. 2013-074630, filed Mar. 29, 2013, the contents of all of which are incorporated herein by reference in their entirety.

TECHNICAL FIELD

The present subject matter relates to an oil pump and a power transmitting device equipped with the same.

BACKGROUND ART

Conventionally, for this type of oil pump, an oil pump is known that is disposed at a position spaced apart from a main shaft of an automatic transmission, and that is driven by power transmitted from a drive sprocket provided on a main shaft side to a driven sprocket attached to a rotation shaft of the oil pump by way of a chain (see e.g., Patent Document 1). In such oil pump, the rotation shaft of the oil pump is spline fitted to a boss portion of the driven sprocket, and a ball bearing is fixed to an outer circumference of the rotation shaft. The ball bearing fixed to the rotation shaft is held by a cylindrical portion formed on a pump cover that covers one end of a pump body, and a snap ring that prevents the ball bearing from falling out of the pump cover is interposed between an outer circumferential portion of the ball bearing and the cylindrical portion of the pump cover. The driven sprocket is thereby supported in a radial direction by the pump cover by way of the ball bearing, and the axial movement thereof with respect to the pump cover is regulated by the snap ring.

CITED RELATED ART DOCUMENT

Patent Document

[Patent Document 1] Japanese Patent Application Publication No. 2006-71026 (JP2006-71026 A)

SUMMARY OF THE INVENTION

However, if the ball bearing is used so that the pump cover supports the driven sprocket in the radial direction as in the above conventional oil pump, the cost increases. Furthermore, in the conventional oil pump, the ball bearing needs to be fixed to the rotation shaft and the snap ring needs to be interposed between the ball bearing and the pump cover so that the driven sprocket is radially and axially supported by the pump cover, and thus the assembly step increases.

It is a main object to reduce the cost and the assembly step required to radially and axially support a driven sprocket of a chain driving mechanism in an oil pump rotatably driven by the chain driving mechanism.

The oil pump and the power transmitting device equipped with the same adopts the following means to achieve the main object.

An oil pump according to an embodiment is an oil pump including an external gear that rotates together with an rotation shaft, an internal gear that meshes with the external gear, and a pump housing including a gear accommodating chamber that accommodates the external gear and the internal gear, the oil pump being disposed in a case that accommodates a transmission coupled to a motor, the oil pump including: a chain driving mechanism including a drive sprocket rotatably driven by power from the motor, a driven sprocket attached to the rotation shaft, and a chain wound around the drive sprocket and the driven sprocket, in which the pump housing includes a supporting hole that faces a part of the case and that supports the rotation shaft so as to be rotatable; the driven sprocket is fixed to the rotation shaft between the pump housing and the part of the case; and movement of the driven sprocket in such a direction that the driven sprocket approaches the case is restricted by a case side projection formed on the part of the case, and movement of the driven sprocket in such a direction that the driven sprocket separates from the case is restricted by a part of the pump housing.

The oil pump includes the pump housing including the gear accommodating chamber that accommodates the external gear and the internal gear, and the pump housing includes the supporting hole that faces the part of the case and that supports the rotation shaft so as to be rotatable. The driven sprocket of the chain driving mechanism is fixed to the rotation shaft between the pump housing and the part of the case. The movement of the driven sprocket in such a direction that the driven sprocket approaches the case is restricted by the case side projection formed on the part of the case and the movement in such a direction that the driven sprocket separates from the case is restricted by the part of the pump housing. Thus, the driven sprocket can be supported in the radial direction without using a ball bearing, and the like by supporting the rotation shaft to which the driven sprocket is attached with the supporting hole of the pump housing. Furthermore, the use and assembly of a dedicated fall-out preventing tool such as a snap ring is unnecessary by restricting the movement of the driven sprocket in such a direction that the driven sprocket approaches the case and in such a direction that the driven sprocket separates from the case, that is, in the axial direction, with the case side projection formed on the part of the case and the part of the pump housing. Thus, in such oil pump, the cost and the assembly steps required to support the driven sprocket of the chain driving mechanism in the radial direction and the axial direction can be reduced. The rotation shaft of the oil pump may be rotatably supported (in the radial direction) by the supporting hole by way of the bush.

The pump housing may include a pump body including the gear accommodating chamber, and a pump cover; the pump cover may include a first cover that is formed to face the part of the case and that covers one end of the pump body, and a second cover that covers the other end of the pump body; the supporting hole may include a first supporting hole that passes through the first cover and a bottomed second supporting hole formed in the second cover; the case side projection may be formed on the part of the case to contact one end of the rotation shaft; and a cover side projection that contacts the other end of the rotation shaft may be formed on a bottom surface of the second supporting hole. Thus, both ends of the rotation shaft are rotatably supported by the first supporting hole of the first cover and the second supporting hole of the second cover, whereby the driven sprocket can be more accurately supported in the radial direction. Furthermore, the driven sprocket can be more accurately supported in the axial direction by restricting the movement of the driven sprocket in the axial direction of the rotation shaft by the case side projection formed on the part of the case and the cover side projection formed on the second cover. The driven sprocket can be accurately supported in the axial direction with a fewer number of case side projections and cover side projections, and the torque loss caused by the friction between the case side projection and the cover side projection, and the rotation shaft can be reduced by forming the case side projection and the cover side projection to contact the rotation shaft rather than the driven sprocket.

Furthermore, the rotation shaft may include a large diameter portion supported by the first supporting hole so as to be rotatable, a small diameter portion supported by the second supporting hole so as to be rotatable, and a coupling portion formed between the large diameter portion and the small diameter portion and coupled to a coupling hole formed in the external gear; the small diameter portion may be formed so as to be inserted into the coupling hole of the external gear; and the coupling portion may be formed so as to be inserted into the first supporting hole. Thus, the rotation shaft and the driven sprocket can be easily assembled to the pump body and the pump cover, that is, the pump housing.

The case may include first case to which the oil pump is coupled, and a second case formed to face the oil pump and coupled to the first case, and the case side projection may be formed on the second case.

A power transmitting device including the oil pump according to an embodiment is a power transmitting device including the oil pump, the transmission, a hydraulic oil accumulating portion that accumulates a hydraulic oil, a strainer disposed between the hydraulic oil accumulating portion and the oil pump to filter the hydraulic oil suctioned by the oil pump from the hydraulic oil accumulating portion, and a hydraulic control device that regulates a pressure of the hydraulic oil discharged from the oil pump and supplies the hydraulic oil to a hydraulic equipment included in the transmission; in which the strainer is disposed beside a the oil pump; and the hydraulic control device is attached to a side part of the case so as to be located on an opposite side of the oil pump from the strainer.

BRIEF DESCRIPTION OF THE DRAWINGS

FIG. 2 is an operation table showing relationship between shift speeds of an automatic transmission 25 and operation states of clutches and brakes.

DESCRIPTION OF A PREFERRED EMBODIMENT

A preferred embodiment will now be described with reference to the drawings.

Figure 1:
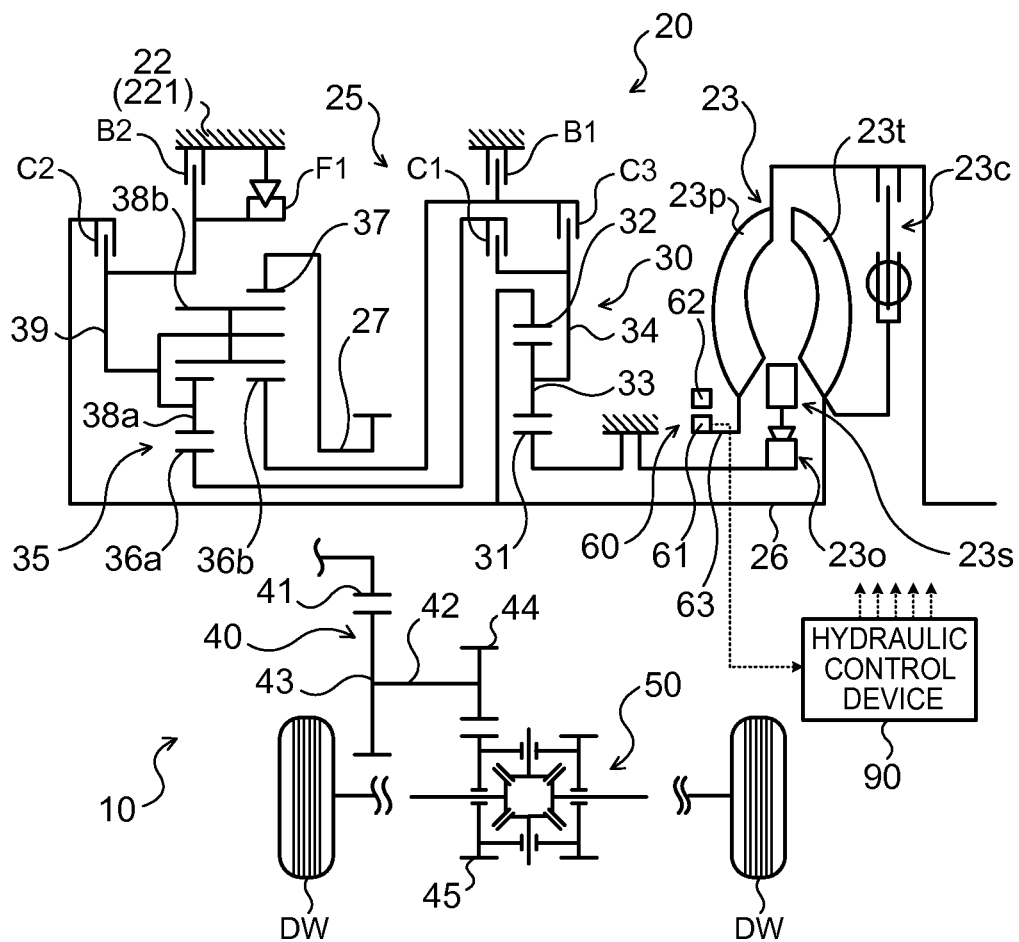
FIG. 1 a configuration diagram schematically showing a power transmitting device 20 including an oil pump 60

FIG. 1 is a configuration diagram schematically showing a power transmitting device 20 including an oil pump 60 according to an exemplary embodiment. The power transmitting device 20 shown in the figure is connected to a crankshaft of an engine (not shown) mounted on a front wheel drive type automobile 10 and is capable of transmitting power from the engine to right and left drive wheels (front wheels) DW. As shown in the figure, the power transmitting device 20 includes a case 22 including a transmission case 221 (first case), a fluid transmitting device 23, an automatic transmission 25 accommodated in the transmission case 221, a gear mechanism 40, a differential mechanism (differential gear) 50, an oil pump 60, a strainer 80 (see FIG. 3) that filters a hydraulic oil (ATF) suctioned by the oil pump 60, and a hydraulic control device 90 that regulates the pressure of the hydraulic oil discharged from the oil pump 60 and outputs the hydraulic oil.

Figure 4:
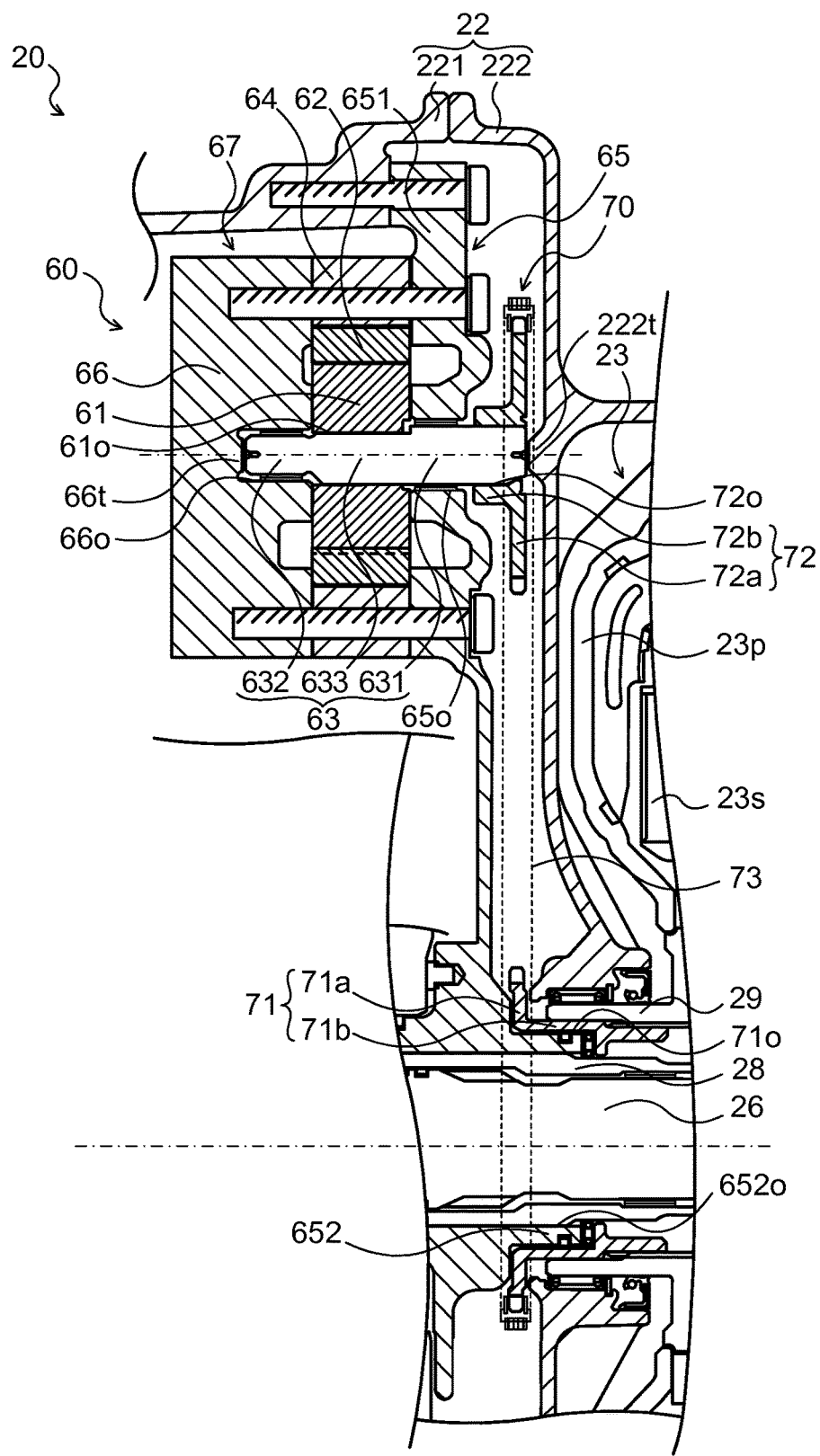
FIG. 4 is a cross-sectional view showing a main part of the power transmitting device 20.

The fluid transmitting device 23 is configured as a torque converter having a torque amplifying action, and is accommodated in a converter housing 222 (second case) that configures a part of the case 22 and that is coupled to the transmission case 221 (see FIG. 4). As shown in FIG. 1, the fluid transmitting device 23 includes an input-side pump impeller 23p connected to the crankshaft of the engine, an output-side turbine runner 23t connected to an input shaft (input member) 26 of the automatic transmission 25, a stator 23s that is disposed on the inner side of the pump impeller 23p and the turbine runner 23t to adjust the flow of the hydraulic oil (ATF) from the turbine runner 23t to the pump impeller 23p, a one-way clutch 23o that limits the rotating direction of the stator 23s to one direction, a lockup clutch 23c, and the like.

The automatic transmission 25 is configured as a six-speed transmission, and includes: as shown in FIG. 1, a single pinion type planetary gear mechanism 30; a Ravigneaux type planetary gear mechanism 35; three clutches C1, C2, and C3, two brakes B1, B2, and a one-way clutch F1 for changing a power transmission path from the input side to the output side, and the like. The single pinion type planetary gear mechanism 30 includes: a sun gear 31, which is an external gear, fixed to the transmission case 221; a ring gear 32, which is an internal toothed gear disposed concentrically to the sun gear 31 and connected to the input shaft 26; a plurality of pinion gears 33 that meshes with the sun gear 31 and that meshes with the ring gear 32, and a carrier 34 that holds the plurality of pinion gears 33 such that the plurality of the pinion gears 33 can rotate and revolve.

The Ravigneaux type planetary gear mechanism 35 includes: two sun gears 36a, 36b, which are external gears; a ring gear 37, which is an internal gear fixed to an output shaft (output member) 27 of the automatic transmission 25; a plurality of short pinion gears 38a that meshes with the sun gear 36a; a plurality of long pinion gears 38b that meshes with the sun gear 36b and the plurality of short pinion gears 38a and that also meshes with the ring gear 37; and a carrier 39 that holds the plurality of short pinion gears 38a and the plurality of long pinion gears 38b, which are coupled to each other, such that the gears can rotate and revolve, and that is supported by the transmission case 221 by way of the one-way clutch F1. The output shaft 27 of the automatic transmission 25 is connected to the drive wheels DW by way of the gear mechanism 40 and the differential mechanism 50.

The clutch C1 is a multi-plate friction type hydraulic clutch (friction engagement element) that includes a hydraulic servo configured by a piston, a plurality of friction plates and mating plates, an oil chamber to which the hydraulic oil is supplied, and the like, and that connects the carrier 34 of the single pinion type planetary gear mechanism 30 and the sun gear 36a of the Ravigneaux type planetary gear mechanism 35 and releases their connection. The clutch C2 is a multi-plate friction type hydraulic clutch that includes a hydraulic servo configured by a piston, a plurality of friction plates and mating plates, an oil chamber to which the hydraulic oil is supplied, and the like, and that connects the input shaft 26 and the carrier 39 of the Ravigneaux type planetary gear mechanism 35 and releases their connection. The clutch C3 is a multi-plate friction type hydraulic clutch that includes a hydraulic servo configured by a piston, a plurality of friction plates and counterpart plates, an oil chamber to which the hydraulic oil is supplied, and the like, and that connects the carrier 34 of the single pinion type planetary gear mechanism 30 and the sun gear 36b of the Ravigneaux type planetary gear mechanism 35 and releases their connection.

The brake B1 is a hydraulic brake that is configured as a band brake or a multi-plate friction type brake including a hydraulic servo, and that fixes the sun gear 36b of the Ravigneaux type planetary gear mechanism 35 to the transmission case 221 and that releases the fixing of the sun gear 36b to the transmission case 222 the brake B2 is a hydraulic brake that is configured as a band brake or a multi-plate friction type brake including a hydraulic servo, and that fixes the carrier 39 of the Ravigneaux type planetary gear mechanism 35 to the transmission case 221 and that releases the fixing of the carrier 39 to the transmission case 222 the one-way clutch F1 includes, for example, an inner race, an outer race, a plurality of sprags, and the like, and transmits torque via the sprags when the outer race is rotated in one direction with respect to the inner race and relatively rotates the inner race and the outer race when the outer race is rotated in the other direction with respect to the inner race. The one-way clutch F1, however, may have a configuration other than the sprag type such as a roller type.

The clutches C1 to C3 and the brakes B1 and B2 are operated by supply/discharge of the hydraulic oil by the hydraulic control device 90. FIG. 2 shows an operation table showing the relationship between shift speeds of the automatic transmission 25 and the operation states of the clutches C1 to C3 and the brakes B1 and B2. The automatic transmission 25 provides first to sixth forward speeds and a reverse speed by bringing the clutches C1 to C3 and the brakes B1 and B2 into the states shown in the operation table of FIG. 2. As shown in FIG. 2, the first speed of the automatic transmission 25 is obtained when the one-way clutch F1 is engaged while the clutch C1 is engaged, and the second speed to the fourth speed are obtained when the clutch C1 is engaged and one of the brake B1, the clutch C2 or C3 is engaged. The fifth speed and the sixth speed of the automatic transmission 25 are obtained when the clutch C2 is engaged and one of the clutch C3 or the brake B1 is engaged. At least one of the clutches C1 to C3, and the brakes B1 and B2 may be a meshing engagement element such as a dog clutch.

The gear mechanism 40 includes a counter drive gear 41 that is coupled to the output shaft 27 of the automatic transmission 25, a counter driven gear 43 that is fixed to the countershaft 42 extending in parallel to the input shaft 26 of the automatic transmission 25 and that meshes with the counter drive gear 41, a drive pinion gear (final drive gear) 44 that is formed in (or fixed to) the countershaft 42, and a differential ring gear (final driven gear) 45 that meshes with the drive pinion gear 44 and is coupled to the differential mechanism 50.

Figure 3:
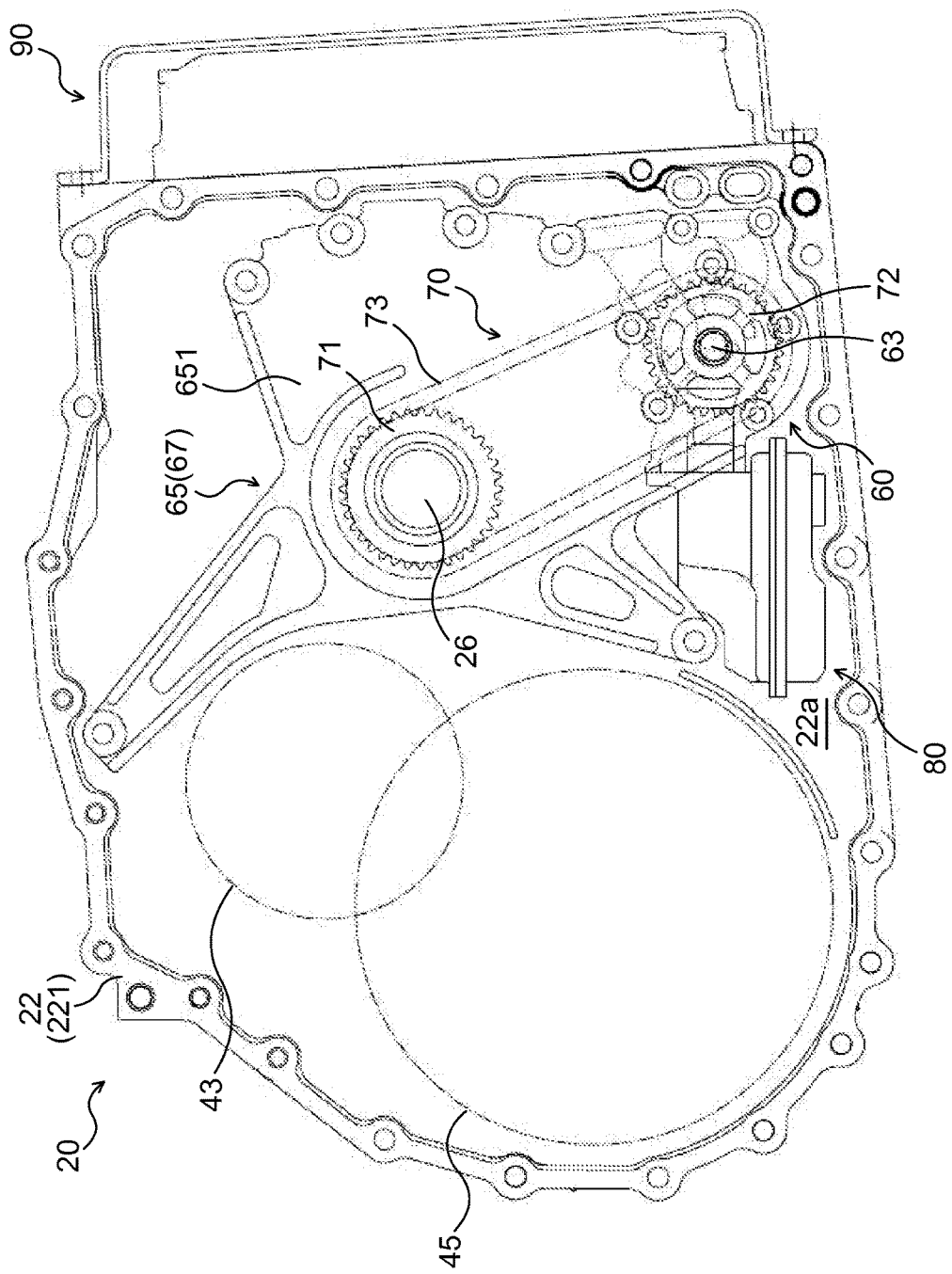
FIG. 3 is a front view of the power transmitting device 20 seen from a fluid transmitting device 23 side.

The oil pump 60 is configured as a gear pump including an external gear 61, an internal gear 62 including a portion that meshes with the external gear 61, a rotation shaft 63 to which the external gear 61 is attached, and a chain driving mechanism 70 (see FIGS. 3 and 4) that transmits the power from the engine to the rotation shaft 63 via the pump impeller 23p of the fluid transmitting device 23. As shown in FIG. 3, the oil pump 60 is disposed in a lower part of the transmission case 222 that is, beside the differential ring gear 45 of the gear mechanism 40 such that the rotation shaft 63 is located on an axis different from the input shaft 26 of the automatic transmission 25. The oil pump 60 is driven by the power from the engine transmitted to the rotation shaft 63 via the chain driving mechanism 70, and suctions the hydraulic oil (ATF) accumulated in a hydraulic oil accumulating portion 22a formed in a lower part of the transmission case 221 and pumps the hydraulic oil to the hydraulic control device 90. Thus, compared to the case where the rotation shaft 63 is disposed coaxially with the input shaft 26, the outer diameters of the rotation shaft 63, the external gear 61, and the internal gear 62 can be reduced, and thus the entire oil pump 60 can be reduced in size.

The strainer 80 is opened in the hydraulic oil accumulating portion 22a and connected to the oil pump 60, and filters the hydraulic oil (ATF) suctioned from the hydraulic oil accumulating portion 22a to the oil pump 60. As shown in FIG. 3, the strainer 80 is disposed in the transmission case 221 so as to be located beside the oil pump 60 on the differential ring gear 45 side. Thus, the power transmitting device 20 can be reduced in size by disposing the oil pump 60 and the strainer 80 in a space beside the differential ring gear 45 that tends to be a dead space.

The hydraulic control device 90 regulates the pressure of the hydraulic oil discharged from the oil pump 60 and generates an oil pressure for operating the fluid transmitting device 23 and the automatic transmission 25, and supplies the hydraulic oil serving as a lubricating cooling medium to a lubricating cooling target such as various types of bearings. As shown in FIG. 3, the hydraulic control device 90 is attached to the side part of the transmission case 221 so as to be located on the opposite side of the oil pump 60 from the strainer 80, and includes a valve body having a plurality of oil passages (not shown), a plurality of regulator valves and relay valves configured by the valve body and a spool or a spring (not shown), and a plurality of linear solenoid valves and on/off solenoid valves attached to the valve body to configure a hydraulic circuit with the oil passage of the valve body (all not shown).

The details on the oil pump 60 of the present embodiment will be described with reference to FIG. 4. FIG. 4 is a cross-sectional view showing a main part of the power transmitting device 20. The oil pump 60 includes, in addition to the above-mentioned external gear 61, the internal gear 62, the rotation shaft 63, and the chain driving mechanism 70, a pump housing 67 configured by a pump body 64 that defines a gear accommodating chamber for accommodating the external gear 61 and the internal gear 62, a front pump cover 65 that is formed to face the converter housing 222 and that covers one end of the pump body 64, and a rear pump cover 66 that coves the other end of the pump body 64. The pump housing 67 may be formed with the pump body 64 and the front pump cover 65 as an integrated member, or formed with the pump body 64 and the rear pump cover 66 as an integrated member.

The external gear 61 of the oil pump 60 is configured as an annular gear member including a plurality of external teeth, and has a coupling hole 610 formed to pass through the center of the external gear 61. The coupling hole 610 of the external gear 61 is a through-hole having a so-called width across flats structure, and is formed by a pair of planar portions extending parallel in the axial direction and facing each other and a pair of arcuate portions extending between the planar portions and facing each other on the inner circumferential surface. The internal gear 62 is configured as an annular gear member including a plurality of internal teeth and meshing with the external teeth of the external gear 61 such that the number of the internal teeth is larger by one than that of the external teeth of the external gear 61, and is disposed eccentrically to the external gear 61. The rotation shaft 63 includes a large diameter portion 631, a small diameter portion 632 having a smaller diameter than the large diameter portion 631, and a coupling portion 633 formed between the large diameter portion 631 and the small diameter portion 632 and coupled to the coupling hole 610 of the external gear 61.

The small diameter portion 632 of the rotation shaft 63 has an outer diameter smaller than a distance between (width across flats) of the pair of planar portions of the coupling hole 610 so as to be inserted to the coupling hole 610 of the external gear 61. The coupling portion 633 is a shaft portion having a so-called width across flats structure, and has an outer circumferential surface formed as a pair of planar portions extending in parallel to the axial direction and facing each other and a pair of arcuate portions extending between the pair of planar portions and facing each other such that the coupling portion 633 can fit into the coupling hole 610 of the external gear 61. The coupling portion 633 is formed such that the radius of the arcuate portion is equal to or smaller than the radius of the large diameter portion 631. The coupling portion 633 is formed to fit into the coupling hole 610 of the external gear 61, and the external gear 61 and the rotation shaft 63 are coupled and integrally rotatable by fitting (coupling) the coupling portion 633 into the coupling hole 61*o*. The external gear 61 and the rotation shaft 63 may be configured to couple to each other through a spline formed in both the external gear 61 and the rotation shaft 63.

The front pump cover 65 includes a flange portion 651 that covers a fluid transmitting device 23 side (right side in FIG. 4) end of the pump body 64, and a cylindrical boss portion 652 extending in the axial direction from the flange portion 651. The flange portion 651 is fastened to the transmission case 221 with a plurality of bolts, and is extended to face the converter housing 222 described above in the transmission case 221. In the flange portion 651, a first supporting hole 65*o* is formed so as to pass through the flange portion 651 at the position spaced apart from the boss portion 652, and the large diameter portion 631 of the rotation shaft 63 is fitted into the first supporting hole 65*o* via a bush so as to be rotatable. The boss portion 652 of the front pump cover 65 has a through-hole 652*o* that passes through the center thereof, and a fixed shaft portion 28, which is integrated with the transmission case 221 and rotatably supports the input shaft 26 of the automatic transmission 25, is fixed (press-fitted) into the through-hole 652*o*. Thus, the front pump cover 65 is supported by the transmission case 221 via a plurality of bolts and the fixed shaft portion 28 so that the rotation shaft 63 of the oil pump 60 is spaced apart from the input shaft 26 of the automatic transmission 25.

The rear pump cover 66 is disposed such that the rear pump cover 66 covers the opposite end (left side in FIG. 4) of the pump body 64 from the from the fluid transmitting device 23 and that the end face on the opposite side from the pump body 64 contacts the contacting portion (not shown) formed in the transmission case 222 the rear pump cover 66 is fastened to the front pump cover 65 via the pump body 64 with a plurality of bolts. The pump body 64, the front pump cover 65, and the rear pump cover 66 are thereby integrated and fixed (coupled) to the transmission case 222 the rear pump cover 66 includes a bottomed second supporting hole 66*o* formed to extend from a pump body 64 side end toward substantially the central part. The second supporting hole 66*o* is formed to extend coaxially with the first supporting hole 65*o* of the front pump cover 65 with the front pump cover 65 and the rear pump cover 66 integrated, and the small diameter portion 632 of the rotation shaft 63 is fitted into the second supporting hole 66*o* via a bush so as to be rotatable. The rotation shaft 63 is thus supported so as to be rotatable by the first supporting hole 65*o* of the front pump cover 65 and the second supporting hole 66*o* of the rear pump cover 66.

The chain driving mechanism 70 that transmits the power from the engine to the rotation shaft 63 of the oil pump 60 includes a drive sprocket 71 coupled to the pump impeller 23*p* of the fluid transmitting device 23 via the hub 29, a driven sprocket 72 attached to the rotation shaft 63, and a chain 73 wound around the drive sprocket 71 and the driven sprocket 72.

The drive sprocket 71 is configured as an annular gear member having gear teeth formed on the outer circumference, and includes a disc portion 71*a* having the gear teeth and a boss portion 71*b* extending in an axial direction from the disc portion 71*a* and having a center hole 71*o*. The center hole 710 of the boss portion 71*b* of the drive sprocket 71 is fitted on the boss portion 652 of the front pump cover 65 so as to be rotatable. A spline is formed in a fluid transmitting device 23 side (right side in FIG. 4) end of the boss portion 71*b* so that the boss portion 71*b* can engage with a spline formed in the hub 29. Coupling the boss portion 71*b* and the hub 29 by the splines allows rotating the drive sprocket 71 together with the pump impeller 23*p*.

The driven sprocket 72 is configured as an annular gear member having gear teeth formed on the outer circumference, and includes a disc portion 72*a* having the gear teeth and a boss portion 72*b* extending in the axial direction from the disc portion 72*a* and having a center hole 72*o*. The large diameter portion 631 of the rotation shaft 63 is formed to extend from the front pump cover 65 to the vicinity of the converter housing 222 while being fitted into the first supporting hole 65*o*. The outer circumferential surface of the portion of the large diameter portion 631 that extends between the front pump cover 65 and the converter housing 222 is fixed (press-fitted) in the center hole 72*o* formed in the boss portion 72*b* of the driven sprocket 72. The driven sprocket 72 and the rotation shaft 63 thus can rotate together.

The chain 73 is wound around the gear teeth formed on the individual outer circumferences of the drive sprocket 71 and the driven sprocket 72 configured as above. Thus, the power from the engine can be transmitted to the rotation shaft 63 of the oil pump 60 via the drive sprocket 71, the chain 73, and the driven sprocket 72, which allows rotatably driving the external gear 61 and the internal gear 62.

Now, a supporting structure of the driven sprocket 72 of the chain driving mechanism 70 included in the oil pump 60 of the present embodiment will be described. As described above, the driven sprocket 72 is fixed to the large diameter portion 631 of the rotation shaft 63. The large diameter portion 631 of the rotation shaft 63 is supported by the first supporting hole 65*o* of the front pump cover 65, and the small diameter portion 632 is supported by the second supporting hole 66*o* of the rear pump cover 66. Thus, the driven sprocket 72 can be accurately supported in the radial direction by the first supporting hole 65*o* of the front pump cover 65 and the second supporting hole 66*o* of the rear pump cover 66 via the rotation shaft 63 without using the ball bearing, and the like. Accordingly, the number of components and the assembly steps can be reduced.

In the power transmitting device 20 of the present embodiment, a case side projection 222t222t extending toward one end of the rotation shaft 63 is formed in the converter housing 222 and a cover side projection 66t extending from the bottom surface of the second supporting hole 66o toward the other end of the rotation shaft 63 is formed in the rear pump cover 66 so that the driven sprocket 72 (and rotation shaft 63) is axially supported. The case side projection 222t222t is extended from an oil pump 60 side end face of the converter housing 222 to the vicinity of the end of the large diameter portion 631 of the rotation shaft 63. The cover side projection 66t is extended from the bottom surface of the second supporting hole 66o to the vicinity of the end of the small diameter portion 632 of the rotation shaft 63. Thus, when the rotation shaft 63 and the driven sprocket 72 move in such a direction that they approach the converter housing 222, the case side projection 222t222t contacts the end of the large diameter portion 631 and thus restricts the movement of the rotation shaft 63 and the driven sprocket 72 in the relevant direction. Furthermore, when the rotation shaft 63 and the driven sprocket 72 move in such a direction that they separate from the converter housing 222, the cover side projection 66t contacts the end of the small diameter portion 632 and restricts the movement of the rotation shaft 63 and the driven sprocket 72 in the relevant direction.

Forming the case side projection 222t222t on the converter housing 222 and forming the cover side projection 66t on the bottom surface of the second supporting hole 66o allows the driven sprocket 72 (and rotation shaft 63) to be sandwiched and axially supported by the converter housing 222 and the rear pump cover 66 without using a dedicated fall-out preventing tool such as the snap ring. Accordingly, the number of components and the assembly steps thus can be reduced. The driven sprocket 72 can be accurately supported in the axial direction with a fewer number of case side projections 222t222t and cover side projections 66t, and the torque loss by the friction between the case side projection 222t222t and the cover side projection 66t and the rotation shaft 63 can be reduced by forming the case side projection 222t222t and the cover side projection 66t to contact the rotation shaft 63 rather than the driven sprocket 72.

Next, the assembly procedure of the driven sprocket 72 (and rotation shaft 63) to the oil pump 60 will be described. In the oil pump 60 of the present embodiment, the external gear 61 and the internal gear 62 are first accommodated in the gear accommodating chamber of the pump body 64, the front pump cover 65 and the rear pump cover 66 are fastened to the pump body 64. The pump body 64, the front pump cover 65, and the rear pump cover 66, which are integrated, are fixed to the transmission case 222 the driven sprocket 72 is fixed to the large diameter portion 631 of the rotation shaft 63, and then the rotation shaft 63 is assembled to the pump body 64, the front pump cover 65 and the rear pump cover 66. As described above, the small diameter portion 632 of the rotation shaft 63 is formed so as to be inserted into the coupling hole 610 of the external gear 61. The coupling portion 633 of the rotation shaft 63 is formed such that the radius of the arcuate portions is equal to or smaller than the radius of the large diameter portion 631. In other words, the coupling portion 633 is formed so as to be interposed between the first supporting hole 65o and the large diameter portion 631 and so as to be inserted into a bush to which the large diameter portion 631 is fitted. Thus, after the driven sprocket 72 is fixed to the large diameter portion 631 of the rotation shaft 63, the rotation shaft 63 is inserted sequentially into the first supporting hole 65o of the front pump cover 65, the coupling hole 610 of the external gear 61, and the second supporting hole 66o of the rear pump cover 66 from the small diameter portion 632 side. Accordingly, the driven sprocket 72 can be easily assembled to the front pump cover 65, the rear pump cover 66, and the pump body 64, integrally with the rotation shaft 63. However, the structure of the large diameter portion 631, the small diameter portion 632, and the coupling portion 633 of the rotation shaft 63, and the assembly procedure of the rotation shaft 63 and the driven sprocket 72 to the front pump cover 65, the rear pump cover 66, and the pump body 64 are not limited thereto.

As described above, the oil pump 60 of the present embodiment includes the pump housing 67 configured by the pump body 64, which includes a gear accommodating chamber 64a for accommodating the external gear 61 and the internal gear 62, the front pump cover 65 that covers one end of the pump body 64, and the rear pump cover 66 that covers the other end of the pump body 64. The front pump cover 65 includes the first supporting hole 65o that faces the converter housing 222, which is a part of the transmission case 221, and that supports the large diameter portion 631 of the rotation shaft 63 so as to be rotatable. The rear pump cover 66 includes the second supporting hole 66o that supports the small diameter portion 632 of the rotation shaft 63 so as to be rotatable. The driven sprocket 72 of the chain driving mechanism 70 is fixed to the rotation shaft 63 between the front pump cover 65 and the converter housing 222. The movement of the driven sprocket 72 (and rotation shaft 63) in such a direction that they approach the converter housing 222 is restricted by the case side projection 222t222t formed on the converter housing 222 and the movement in such a direction that they separate from the converter housing 222 is restricted by the cover side projection 66t formed on the bottom surface of the second supporting hole 66o.

Thus, the driven sprocket 72 can be more accurately supported in the radial direction without using the ball bearing, and the like by supporting the large diameter portion 631 of the rotation shaft 63 to which the driven sprocket 72 is attached with the first supporting hole 65o and supporting the small diameter portion 632 with the second supporting hole 66o. The movement of the rotation shaft 63 and the driven sprocket 72 in such a direction that they approach the converter housing 222 and in such a direction that they separate from the convertor housing 222, that is, the movement in the axial direction is restricted by the case side projection 222t222t formed on the converter housing 222 and the cover side projection 66t formed on the rear pump cover 66. This allows the driven sprocket 72 to be axially supported more accurately, and the use and assembly of the dedicated fall-out preventing tool such as a snap ring is unnecessary. Therefore, in the oil pump 60, the cost and the assembly steps required to support the driven sprocket 72 of the chain driving mechanism 70 in the radial direction and the axial direction can be reduced.

Figure 5:
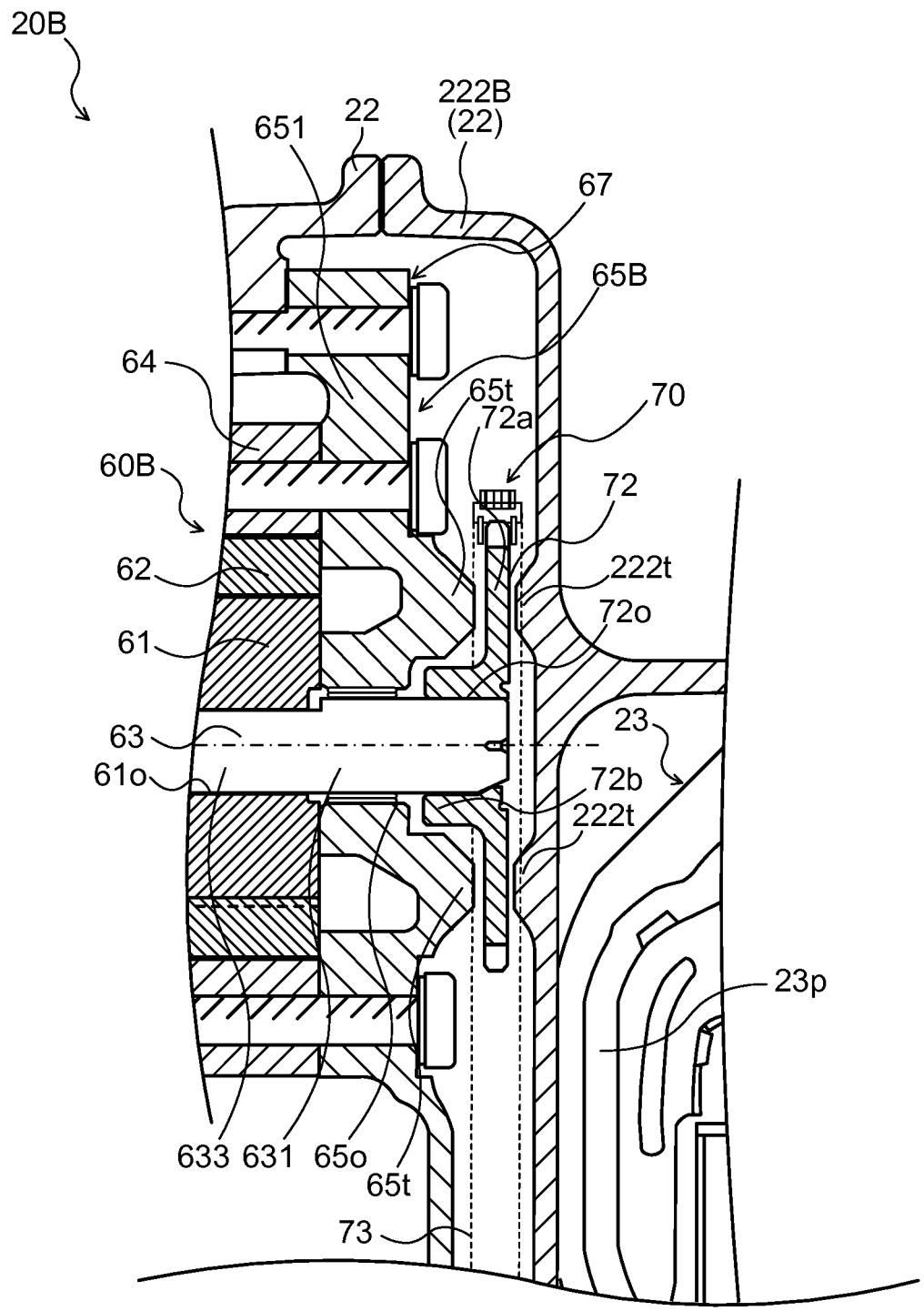
FIG. 5 is an enlarged cross-sectional view showing a main part of a power transmitting device 20B including an oil pump 60B according to another embodiment.

In the embodiment described above, the case side projection 222t is formed on the converter housing 222 so as to contact the end of the large diameter portion 631 of the rotation shaft 63, and the cover side projection 66t is formed on the bottom surface of the second supporting hole 66o of the rear pump cover 66 so as to contact the end of the small diameter portion 632 of the rotation shaft 63, but the positions for forming the case side projection 222t and the cover side projection 66t are not limited thereto. In other words, the case side projection 222t that can contact the disc portion 72a of the driven sprocket 72 may be formed on a converter housing 222B as in a power transmitting device 20B including an oil pump 60B according to another embodiment shown in FIG. 5. Furthermore, the cover side projection 66t may be omitted from the second supporting hole 66o of the rear pump cover 66, and cover side projections 65t that can contact the disc portion 72a of the driven sprocket 72 may be formed on a front pump cover 65B. In this case, at least one case side projection 222t and at least one cover side projection 65t may be formed. A plurality of the case side projections 222t and a plurality of the cover side projections 65t may be formed in the circumferential direction of the driven sprocket 72, or the case side projection 222t and the cover side projection 65t may be formed in an annular shape along the circumferential direction of the driven sprocket 72. Thus, if the cover side projection 65st are formed on the front pump cover 65B, the second supporting hole 66o may be omitted from the rear pump cover 66, the small diameter portion 632 may be omitted from the rotation shaft 63, and the rotation shaft 63 and the driven sprocket 72 may be supported by only the first supporting hole 65o of the front pump cover 65.

In the power transmitting device 20 of the present embodiment, the oil pump 60 is disposed in the lower part of the transmission case 221, but the subject matter described herein may be applied to any power transmitting device that has an oil pump disposed in an upper side of the transmission case 221 as long as the oil pump is driven by the chain driving mechanism 70. Furthermore, in the power transmitting device 20 of the present embodiment, the strainer 80 is disposed beside the oil pump 60, and the hydraulic control device 90 is attached to the side part of the transmission case 221 so as to be located on the opposite side of the oil pump 60 from the strainer 80, but the oil pump 60 may be applied to the power transmitting device in which the strainer 80 and the hydraulic control device 90 are disposed in other positions. An oil pan for accumulating the hydraulic oil may be provided instead of forming the hydraulic oil accumulating portion 22a in the lower part of the transmission case 221.

In the embodiment described above, and the like, the oil pump 60 which includes the external gear 61 that rotates together with the rotation shaft 63, the internal gear 62 that meshes with the external gear 61, and the pump housing 67 (pump body 64, front pump cover 65, and rear pump cover 66) including the gear accommodating chamber 64a that accommodates the external gear 61 and the internal gear 62, and is disposed in the transmission case 221 accommodating the automatic transmission 25 coupled to the engine corresponds to the "oil pump"; the chain driving mechanism 70 which includes the drive sprocket 71 rotatably driven by the power from the engine, the driven sprocket 72 attached to the rotation shaft 63 of the oil pump 60, and the chain 73 wound around the drive sprocket 71 and the driven sprocket 72 corresponds to the "chain driving mechanism"; the front pump cover 65 that is formed to face the converter housing 222 and that covers one end of the pump body 64 corresponds to the "first cover"; the rear pump cover 66 that covers the other end of the pump body 64 corresponds to the "second cover"; the first supporting hole 65o that passes through the front pump cover 65 corresponds to the "first supporting hole"; the bottomed second supporting hole 66o formed in the rear pump cover 66 corresponds to the "second supporting hole"; the transmission case 221 corresponds to the "first case"; and the converter housing 222 corresponds to the "second case".

An embodiment has been described above, but the present subject matter is not limited in any way to the embodiment, and it should be recognized that various changes can be made.

INDUSTRIAL APPLICABILITY

The present subject matter is applicable to the manufacturing industry, and the like of oil pumps and power transmitting devices equipped with the same.

The invention claimed is:

1. An oil pump including an external gear that rotates together with a rotation shaft, an internal gear that meshes with the external gear, and a pump housing including a gear accommodating chamber that accommodates the external gear and the internal gear, the oil pump being disposed in a case that accommodates a transmission coupled to a motor, the oil pump comprising:
   a chain driving mechanism including a drive sprocket rotatably driven by power from the motor, a driven sprocket attached to the rotation shaft, and a chain wound around the drive sprocket and the driven sprocket, wherein
   the pump housing includes a supporting hole that faces a part of the case and that supports the rotation shaft so as to be rotatable;
   the driven sprocket is fixed to the rotation shaft between the pump housing and the part of the case; and
   movement of the driven sprocket in such a direction that the driven sprocket approaches the case is restricted by a case side projection formed on the part of the case, and movement of the driven sprocket in such a direction that the driven sprocket separates from the case is restricted by a part of the pump housing, wherein
   the pump housing includes a pump body including the gear accommodating chamber, and a pump cover;
   the pump cover includes a first cover that is formed to face the part of the case and that covers one end of the pump body, and a second cover that covers the other end of the pump body;
   the supporting hole includes a first supporting hole that passes through the first cover and a bottomed second supporting hole formed in the second cover;
   the case side projection is formed on the part of the case to contact one end of the rotation shaft; and
   a cover side projection that contacts the other end of the rotation shaft is formed on a bottom surface of the second supporting hole.

2. The oil pump according to claim 1, wherein
   the rotation shaft includes a large diameter portion supported by the first supporting hole so as to be rotatable, a small diameter portion supported by the second supporting hole so as to be rotatable, and a coupling portion formed between the large diameter portion and the small diameter portion and coupled to a coupling hole formed in the external gear;
   the small diameter portion is formed so as to be inserted into the coupling hole of the external gear; and
   the coupling portion is formed so as to be inserted into the first supporting hole.

3. The oil pump according to claim 2, wherein
   the case includes a first case to which the oil pump is coupled, and a second case formed to face the oil pump and coupled to the first case, the case side projection is formed on the second case.

4. A power transmitting device comprising:
   the oil pump according to claim 3;

the transmission coupled to the motor;
a hydraulic oil accumulating portion that accumulates a hydraulic oil;
a strainer disposed between the hydraulic oil accumulating portion and the oil pump to filter the hydraulic oil suctioned by the oil pump from the hydraulic oil accumulating portion; and
a hydraulic control device that regulates a pressure of the hydraulic oil discharged from the oil pump and supplies the hydraulic oil to hydraulic equipment included in the transmission, wherein
the strainer is disposed beside the oil pump; and
the hydraulic control device is attached to a side part of the case so as to be located on an opposite side of the oil pump from the strainer.

5. The oil pump according to claim 1, wherein
the case includes a first case to which the oil pump is coupled, and a second case formed to face the oil pump and coupled to the first case, the case side projection is formed on the second case.

6. A power transmitting device comprising:
the oil pump according to claim 1;
the transmission coupled to the motor;
a hydraulic oil accumulating portion that accumulates a hydraulic oil;
a strainer disposed between the hydraulic oil accumulating portion and the oil pump to filter the hydraulic oil suctioned by the oil pump from the hydraulic oil accumulating portion; and
a hydraulic control device that regulates a pressure of the hydraulic oil discharged from the oil pump and supplies the hydraulic oil to hydraulic equipment included in the transmission, wherein
the strainer is disposed beside the oil pump; and
the hydraulic control device is attached to a side part of the case so as to be located on an opposite side of the oil pump from the strainer.

7. The oil pump according to claim 1, wherein the case side projection overlaps the chain as seem from the radial direction.

8. An oil pump including an external gear that rotates together with an rotation shaft, an internal gear that meshes with the external gear, and a pump housing including a gear accommodating chamber that accommodates the external gear and the internal gear, the oil pump being disposed in a case that accommodates a transmission coupled to a motor, the oil pump comprising:

a chain driving mechanism including a drive sprocket rotatably driven by power from the motor, a driven sprocket attached to the rotation shaft, and a chain wound around the drive sprocket and the driven sprocket, wherein
the pump housing includes a pump body including the gear accommodating chamber, and a pump cover;
the pump cover includes a first cover that covers one end of the pump body and a second cover that covers the other end of the pump body;
the first cover includes a first supporting hole that is disposed so as to face a part of the case in the axial direction of the rotation shaft and that is a through hole supporting the rotation shaft so as to be rotatable via a first bearing that receives load in a radial direction;
the second cover includes a second supporting hole that supports the rotation shaft so as to be rotatable via a second bearing that receives load in the radial direction, and contacts the rotation shaft in the axial direction to restrict movement of the driven sprocket in such a direction that the driven sprocket separates from the case;
the driven sprocket is fixed to the rotation shaft so as to be disposed between the first cover and the part of the case; and
the case contacts the rotation shaft in the axial direction to restrict movement of the driven sprocket in such a direction that the driven sprocket approaches the case.

9. The oil pump according to claim 8, further comprising:
a case side projection that projects toward the rotation shaft is formed on the part of the case to contact one end of the rotation shaft, and restricts movement of the driven sprocket in such a direction that the driven sprocket approaches the case; and
a cover side projection that projects toward the rotation shaft is formed on a bottom surface of the second supporting hole to contact the other end of the rotation shaft, and restricts movement of the driven sprocket in such a direction that the driven sprocket separates from the case.

10. The oil pump according to claim 9, wherein the case side projection overlaps the chain as seem from the radial direction.

* * * * *